UNITED STATES PATENT OFFICE.

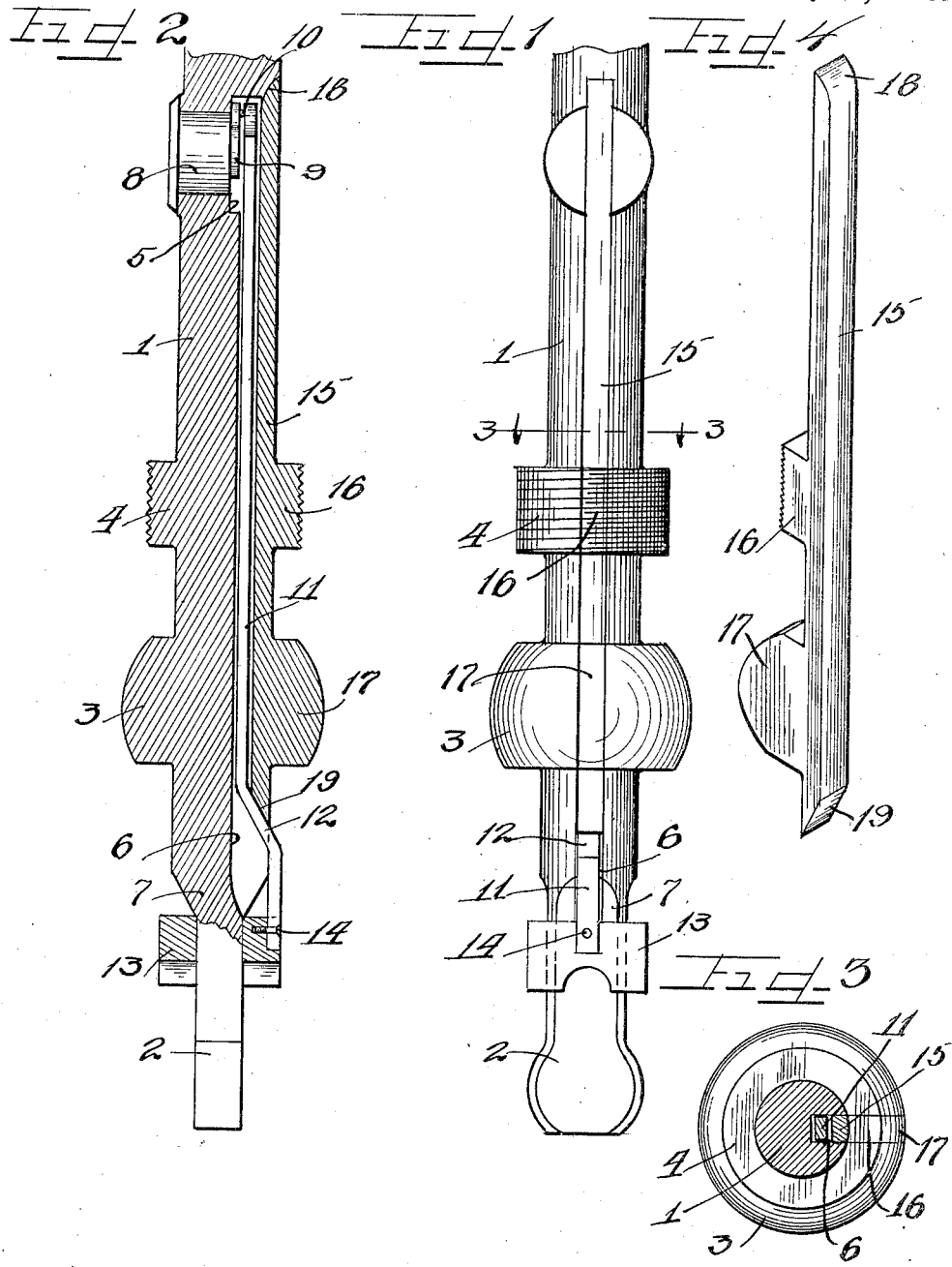

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT LEVER.

1,346,209.   Specification of Letters Patent.   Patented July 13, 1920.

Application filed March 10, 1919. Serial No. 281,646.

*To all whom it may concern:*

Be it known that I, COLVIN L. JOHNSON, a citizen of the United States, and a resident of the city of Chicago, in the county of Cook and State of Illinois, have invented certain new and useful Improvements in Gear-Shift Levers; and I do hereby declare that the following is a full, clear, and exact description of the same, reference being had to the accompanying drawings and to the numerals of reference marked thereon, which form a part of this specification.

It has been the practice in equipping a gear shift lever with a locking mechanism, embracing broadly, a key operated connecting rod disposed within the gear shift lever with the lower projecting end of the rod connected to a locking block slidable on the lower end of the lever, to drill the lever longitudinally to provide the necessary passage in the lever for receiving the connecting rod.

This invention relates more particularly to the method of preparing a gear shift lever to receive a locking mechanism therein, with the connecting rod of the locking mechanism slidably mounted within a longitudinal groove cut in one side of the lever and after mounting of the connecting rod is closed by permanently brazing, welding or soldering a suitably shaped closure key into the outer portion of the groove.

It is an object of this invention to provide a grooved gear shift lever with a key, shaped to securely close the groove and conform to the shape of the exterior of the lever.

It is also an object of the invention to provide a method of preparing a gear shift lever to permit mounting of a locking mechanism therein by first cutting a longitudinal groove in one side of the lever to permit mounting of a slidable rod therein, and then permanently closing the groove.

Another object of the invention is to provide a method of preparing a gear shift lever to receive a slidable rod, by first cutting an open slot longitudinally therein, mounting the rod in the slot, and then rigidly securing a key in said slot and shaping the same to conform to the shape of the lever.

It is an important object of this invention to rigidly braze a key in position in a cut groove of a gear shift lever to inclose and prevent tampering with a rod slidably disposed within the groove and connected with a key lock and a locking block.

Other and further important objects of my invention will be apparent from the disclosures in the specification and drawings.

The invention (in a preferred form) is illustrated in the drawings and hereinafter more fully described.

On the drawings:

Figure 1 is an elevational view of a gear shift lever partly broken away and constructed by a method embodying the principles of this invention.

Fig. 2 is a longitudinal section thereof showing parts in elevation.

Fig. 3 is a section taken on the line 3—3 of Fig. 1.

Fig. 4 is a perspective view of the lever key removed from the lever.

As shown on the drawings:

The reference numeral 1, indicates a cylindrical gear shift lever, the lower end of which is reduced or flattened to afford a tail piece 2. Integrally formed near the lower portion of the lever 1, and above the tail piece 2, is an enlarged ball 3, to permit mounting of the lever in a socket, not shown. Also integrally formed on the lever 1, a short distance above the ball 3, is an exteriorly threaded collar 4. The upper portion of the lever 1, is drilled radially to provide a chamber 5, the inner portion of which is enlarged.

Cut longitudinally in one side of the lever 1, is a long slot or groove 6, the upper portion of which communicates with the enlarged portion of the chamber 5, while the lower end of said groove, opens through the tapered portion 7, integrally connecting the lower cylindrical end of the lever 1, with the tail piece 2.

Secured within the reduced portion of the chamber 5, is a pin lock 8, provided with a key operated drum or barrel 9, which projects into the enlarged portion of the chamber 5, and has secured eccentrically thereon, a pin 10. The pin 10, has engaged thereon the apertured upper end of a connecting rod or bar 11, which is slidably disposed within the groove 6, and has the lower end offset or bent at 12, to project out through the lower end of the groove 6. Slidably mounted upon the tail piece 2, is a locking block 13, to which the lower projecting end of the rod 11, is connected by a screw 14, or other suitable means.

To inclose the rod 11, and prevent meddling with the pin lock mechanisms, a key or closure bar 15, is cut or formed, as shown in Fig. 4, and has integrally formed thereon a threaded projection or lug 16, and a rounded filler block or tongue 17. The ends of the closure key 15, are rounded or beveled at 18 and 19. The key 15, is inserted into the outer portion of the groove 6, with the lug 16, filling the opening in the collar 4, and with the tongue 17, disposed within the opening in the ball 3. The upper key end 18, fits tightly against the lever 1, while the lower tapered end 19, or said key, is positioned a short distance above the lower end of the groove 6, to leave an opening through which the lower end of the connecting rod 11, projects. With the key positioned in the groove 6, as shown in Figs. 1 and 2, the key is securely welded, brazed, or otherwise permanently secured in place, thereby inclosing the gear shift lever locking mechanism, and preventing interference therewith by unauthorized persons.

The method of preparing a gear shift lever to receive a locking mechanism, is to first drill a lock chamber in the lever and then cut a longitudinal groove in one side of the lever to communicate with the lock chamber. The locking members are then mounted in position and the groove is closed by means of the key 15, the parts 16 and 17 of the key, respectively, filling up the cuts in the collar 4, and the balls 3. The threads on the members 4 and 16, may be cut after the key has been secured in position within the groove 6, of the lever.

If desired the lever before being turned to give it its proper shape, may first be cut to provide the longitudinal groove. A plate or bar may then be inserted into the groove to close the outer portion thereof. The inserted plate is then secured to hold the same permanently in place. The lever together with the inserted plate may then be put into a machine and shaped and threaded as shown in Fig. 1.

I am aware that various details of construction may be varied through a wide range without departing from the principles of this invention, and I therefore do not purpose limiting the patent granted otherwise than necessitated by the prior art.

I claim as my invention:

1. The combination with a gear shaft shift lever having a groove cut longitudinally therein, of a key permanently secured in position in the outer portion of said groove.

2. The combination with a chambered gear shift lever having a groove cut longitudinally therein communicating with the chamber in said lever, means in said chamber and groove, means slidably mounted on the lower end of the lever and connected with said means, and a key permanently engaged in the outer portion of said groove having an opening through which said first mentioned means projects.

3. A lever having a groove cut therein, and means for partially filling said groove to leave a passage and a side opening in said lever.

4. A lever having a chamber and a groove therein communicating with one another, and means secured in the outer portion of said groove to afford a passage one end of which communicates with said chamber and the other end of which opens through one side of the lever.

5. The combination with a gear shift lever having a groove cut longitudinally in one side thereof, of a closure key permanently engaged in the outer portion of the groove and leaving a longitudinal passage in the lever opening through the side of the lever below said closure key.

In testimony whereof I have hereunto subscribed my name in the presence of two subscribing witnesses.

COLVIN L. JOHNSON.

Witnesses:
  FRED E. PAISLER,
  EARL M. HARDINE.